(12) United States Patent
Kiefer

(10) Patent No.: US 8,807,495 B2
(45) Date of Patent: *Aug. 19, 2014

(54) LOAD-ABSORBING DEVICE FOR INTRODUCING LOAD FORCES SUCH AS CABLE FORCES OR TENSIONING FORCES OF SHEET-LIKE STRUCTURES

(75) Inventor: Michael Kiefer, Radolfzell (DE)

(73) Assignee: Carl Stahl GmbH, Süssen (DE)

( * ) Notice: Subject to any disclaimer, the term of this patent is extended or adjusted under 35 U.S.C. 154(b) by 273 days.

This patent is subject to a terminal disclaimer.

(21) Appl. No.: 12/998,618

(22) PCT Filed: Mar. 27, 2009

(86) PCT No.: PCT/EP2009/002253
§ 371 (c)(1),
(2), (4) Date: May 9, 2011

(87) PCT Pub. No.: WO2010/054703
PCT Pub. Date: May 20, 2010

(65) Prior Publication Data
US 2011/0217113 A1    Sep. 8, 2011

(30) Foreign Application Priority Data

Nov. 11, 2008 (DE) ............ 20 2008 014 951 U
Jan. 29, 2009 (DE) ............ 20 2009 001 107 U

(51) Int. Cl.
*F16M 11/02* (2006.01)
*F16C 11/06* (2006.01)

(52) U.S. Cl.
CPC ................ *F16C 11/0623* (2013.01)
USPC .......... 248/181.1; 248/288.31; 248/288.51; 403/122; 135/90; 135/123; 135/120.4

(58) Field of Classification Search
USPC .......... 248/181.1, 181.2, 288.51, 288.11, 248/288.31; 403/122, 52, 76, 294, 361, 403/353; 135/87, 90, 123, 151, 152, 153, 135/154, 117, 119, 120.3, 120.4
See application file for complete search history.

(56) References Cited

U.S. PATENT DOCUMENTS

| 2,693,195 | A | * | 11/1954 | Frieder et al. | 135/122 |
| 3,593,997 | A | * | 7/1971 | Boehner | 473/421 |
| 3,957,301 | A | * | 5/1976 | Huber | 296/95.1 |
| 5,286,129 | A | * | 2/1994 | French et al. | 403/24 |
| 5,311,699 | A | * | 5/1994 | Huffman | 47/22.1 |
| 5,622,197 | A | * | 4/1997 | Valaire | 135/90 |

(Continued)

FOREIGN PATENT DOCUMENTS

| DE | 93 00 485 | 5/1993 |
| DE | 20 2004 007 017 U1 | 7/2004 |
| EP | 1 435 419 | 7/2004 |
| GB | 2 437 850 | 11/2007 |

*Primary Examiner* — Todd M Epps
(74) *Attorney, Agent, or Firm* — Roylance, Abrams, Berdo and Goodman LLP

(57) ABSTRACT

A load-absorbing device introduces load forces such as cable forces or tensioning forces of sheet-shaped structures into supporting structures (10). At least one load-absorbing part (36, 40) can be anchored on the supporting structure (10) via a bearing element (24). The load-absorbing part (36, 40) has a transmission body (36) forming a convexly shaped transmission surface guided on the bearing element (24) on a carrier surface formed from surface parts adapted to the convexity of the transmission surface.

31 Claims, 18 Drawing Sheets

(56) References Cited

U.S. PATENT DOCUMENTS

| | | | |
|---|---|---|---|
| 5,778,613 A * | 7/1998 | Thomson | 52/222 |
| 6,247,484 B1 * | 6/2001 | Thomas | 135/123 |
| 8,602,368 B2 * | 12/2013 | Kiefer | 248/181.1 |
| 2005/0127261 A1 * | 6/2005 | Lin | 248/288.51 |
| 2011/0222960 A1 * | 9/2011 | Kiefer | 403/122 |

* cited by examiner

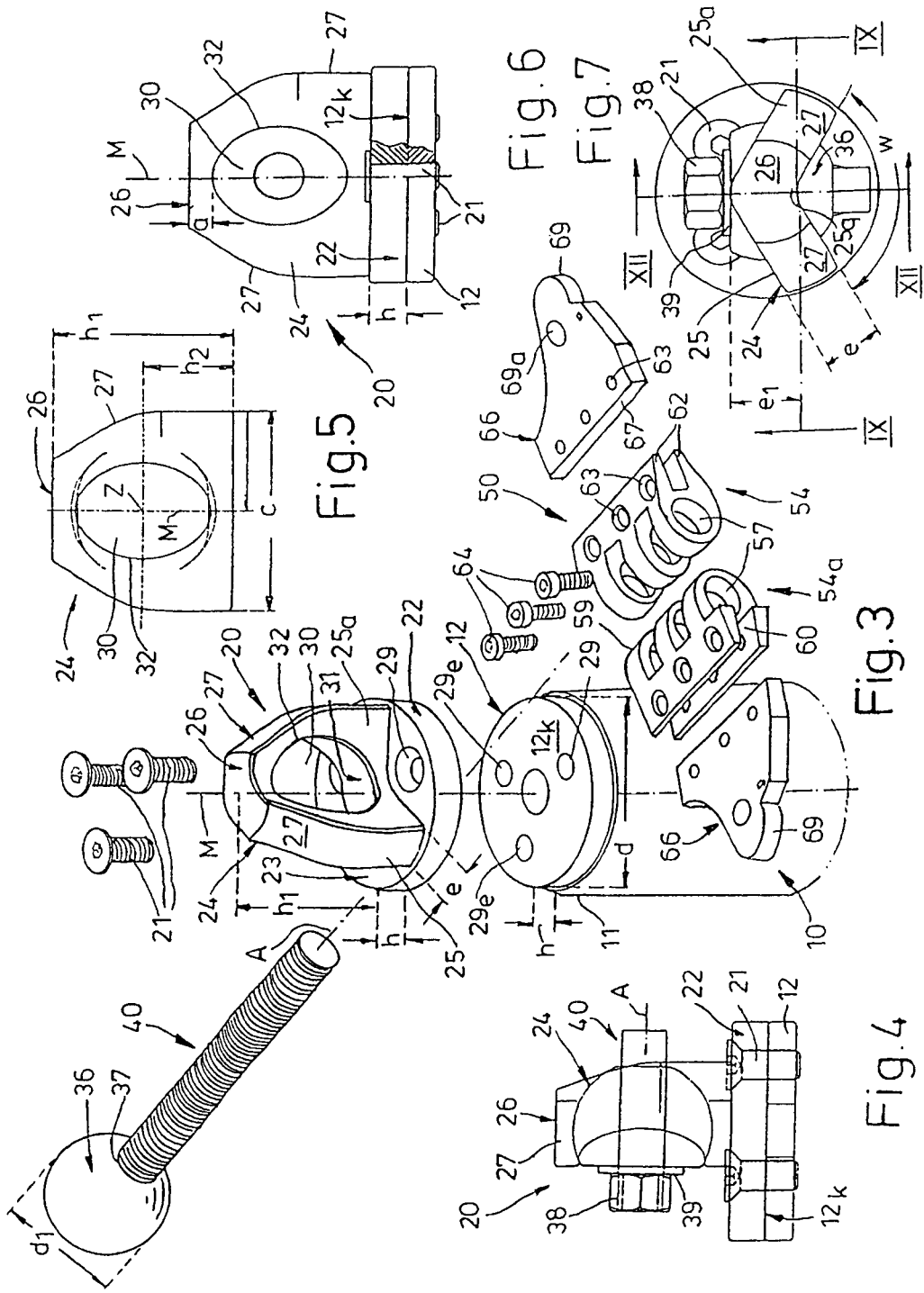

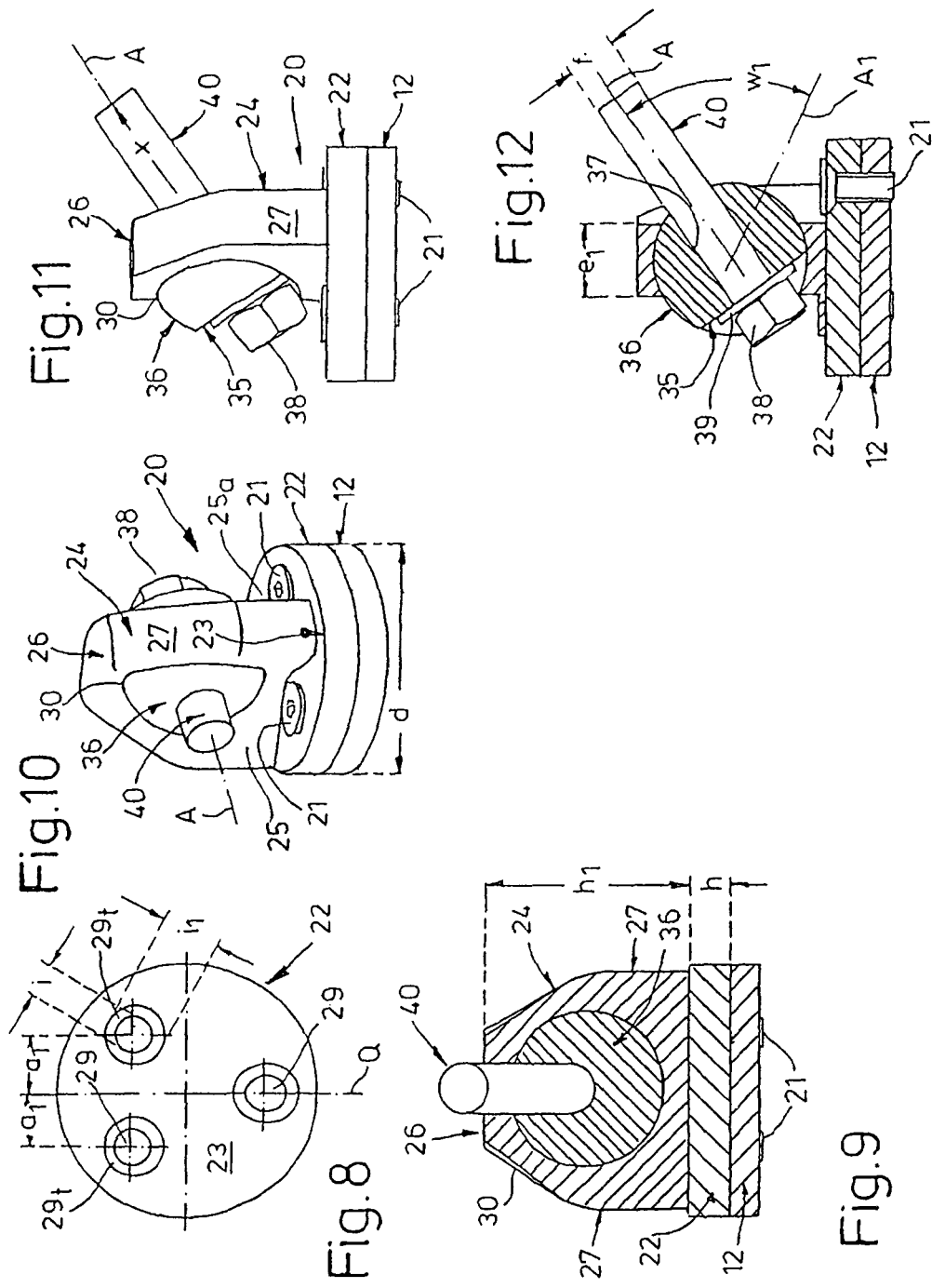

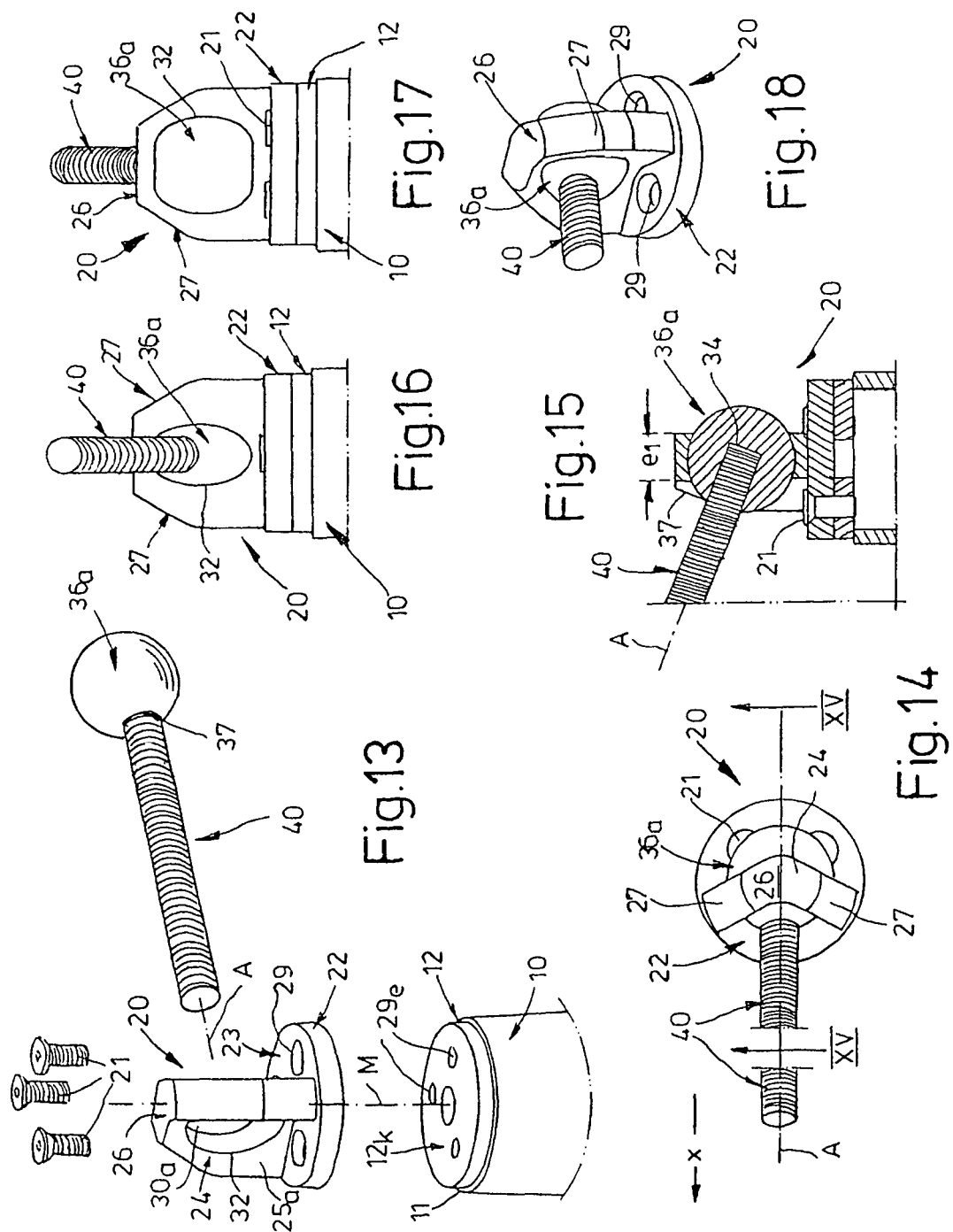

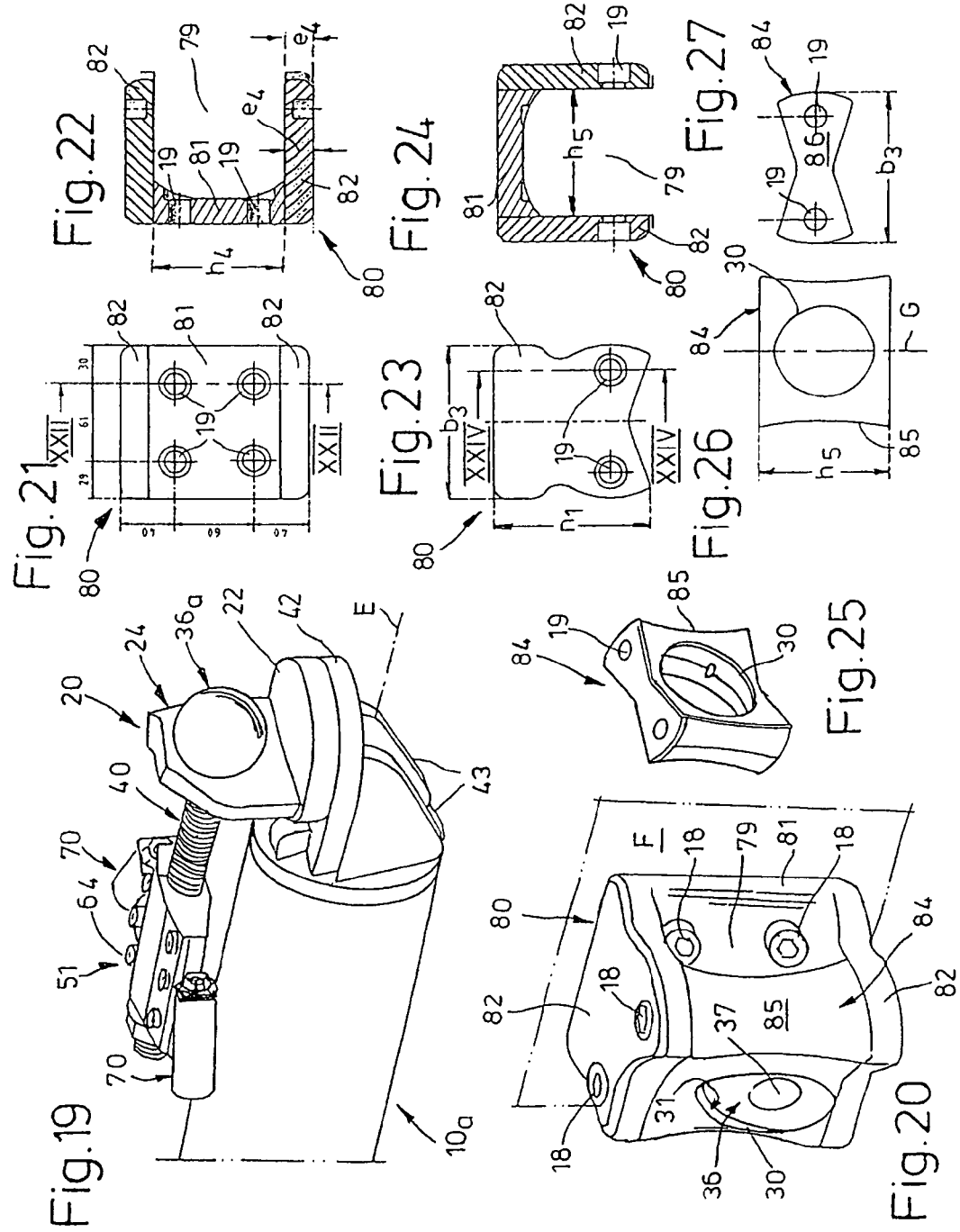

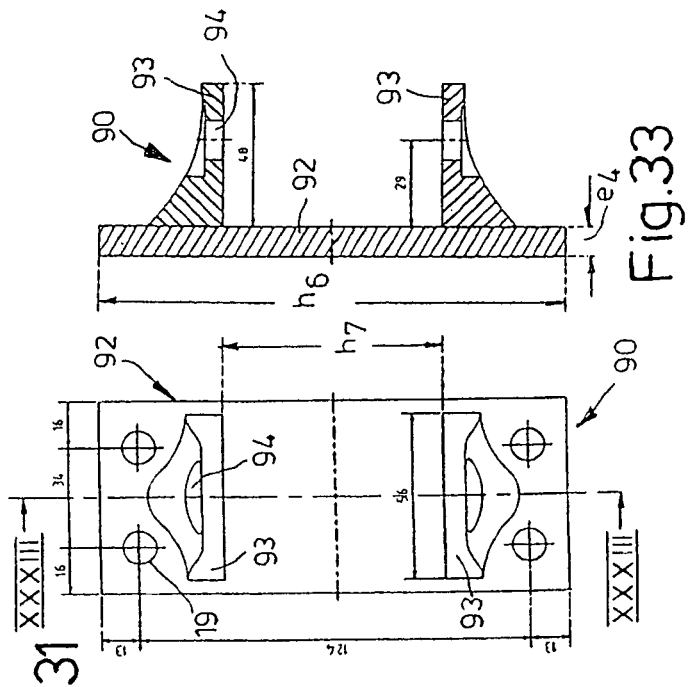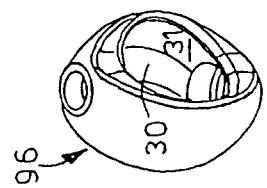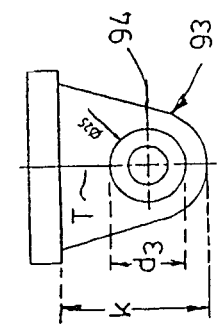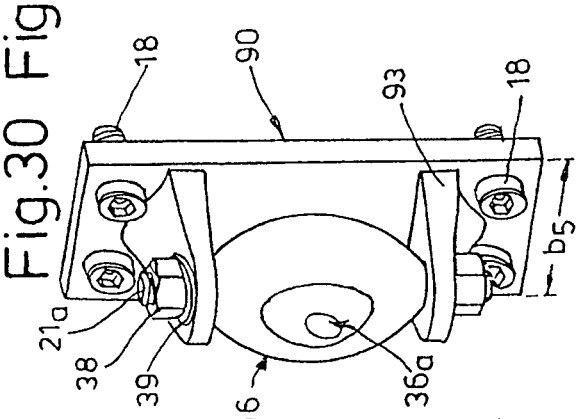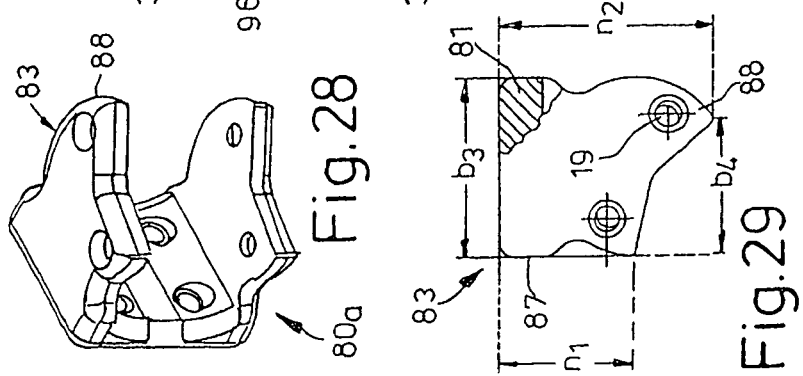

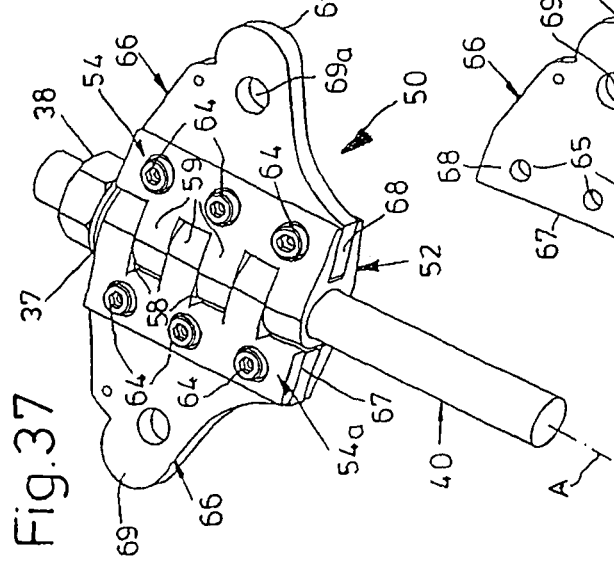
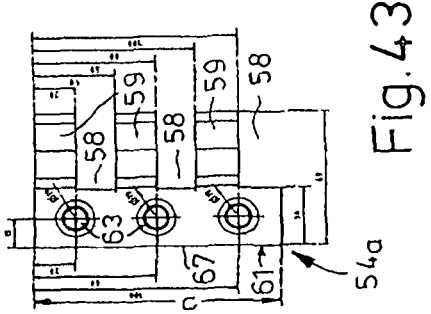
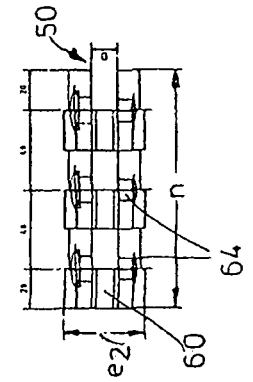
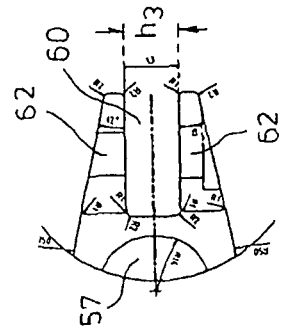
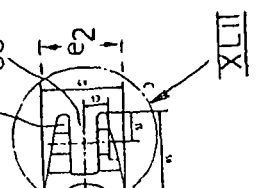
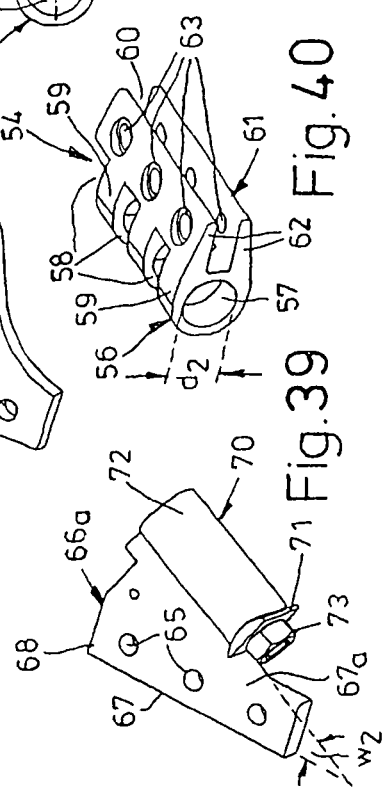

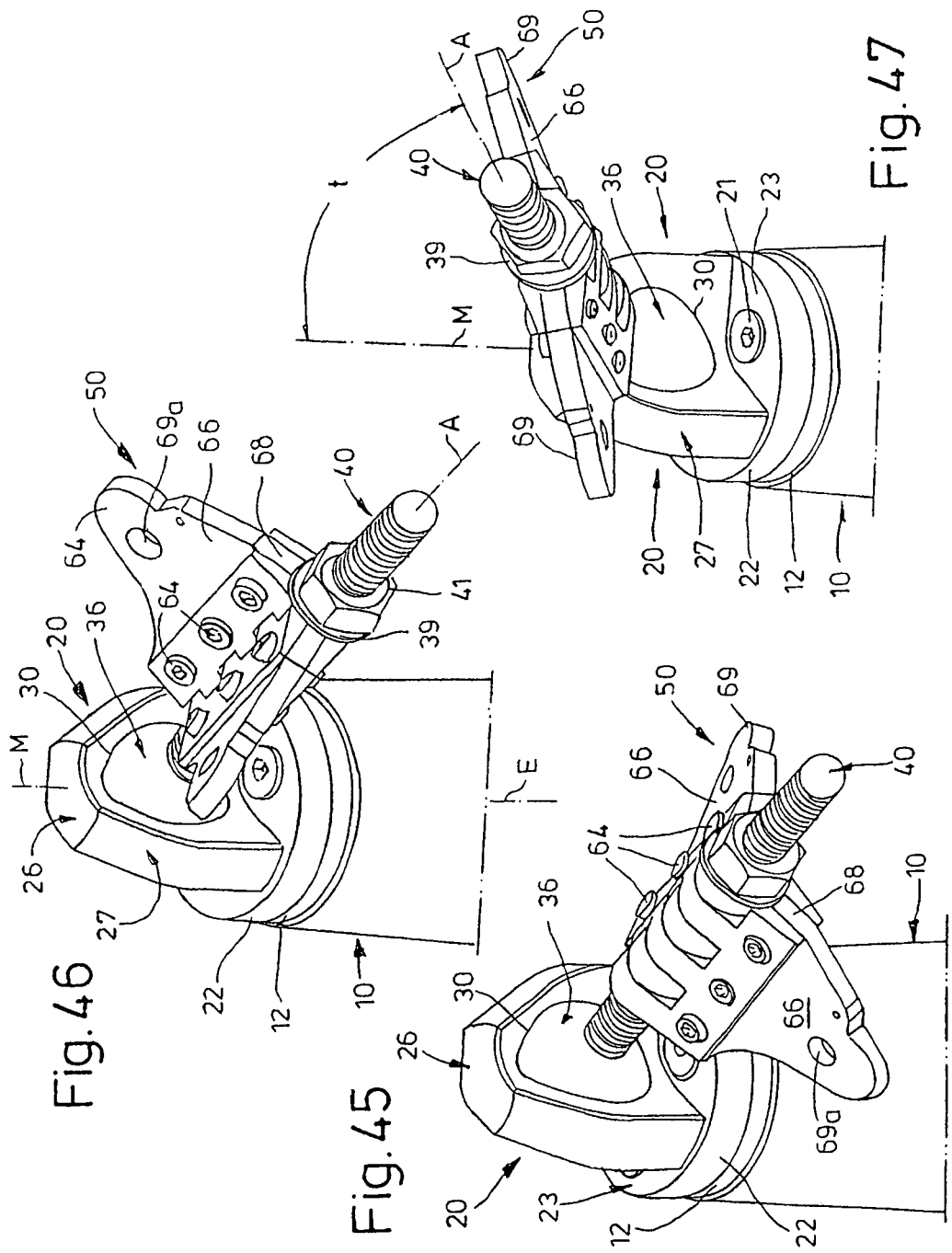

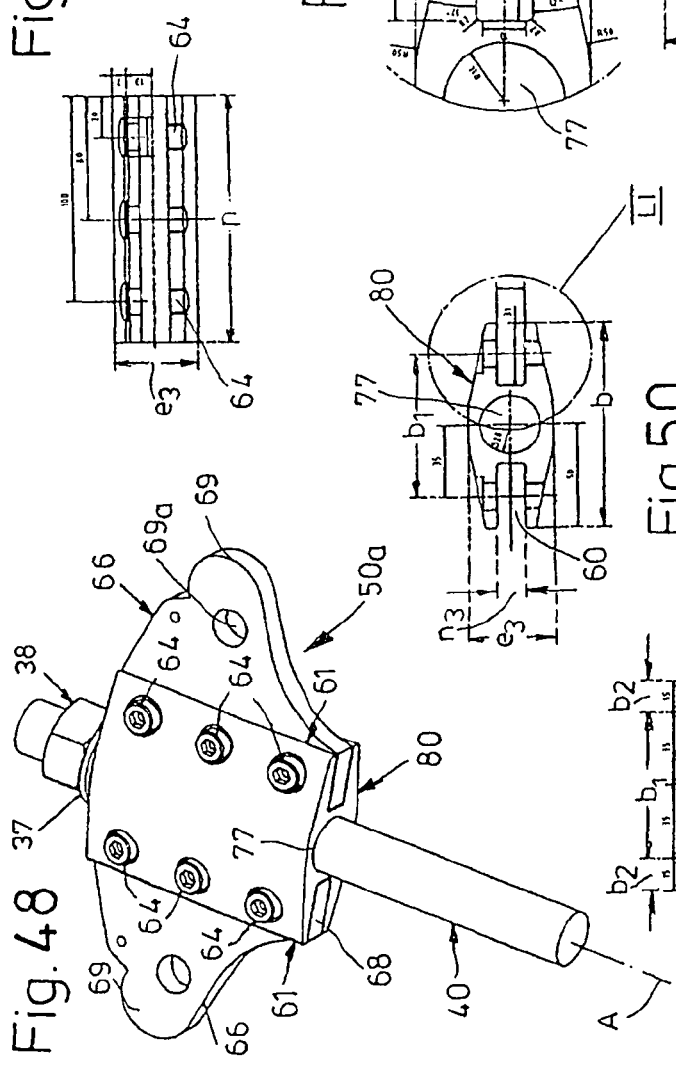

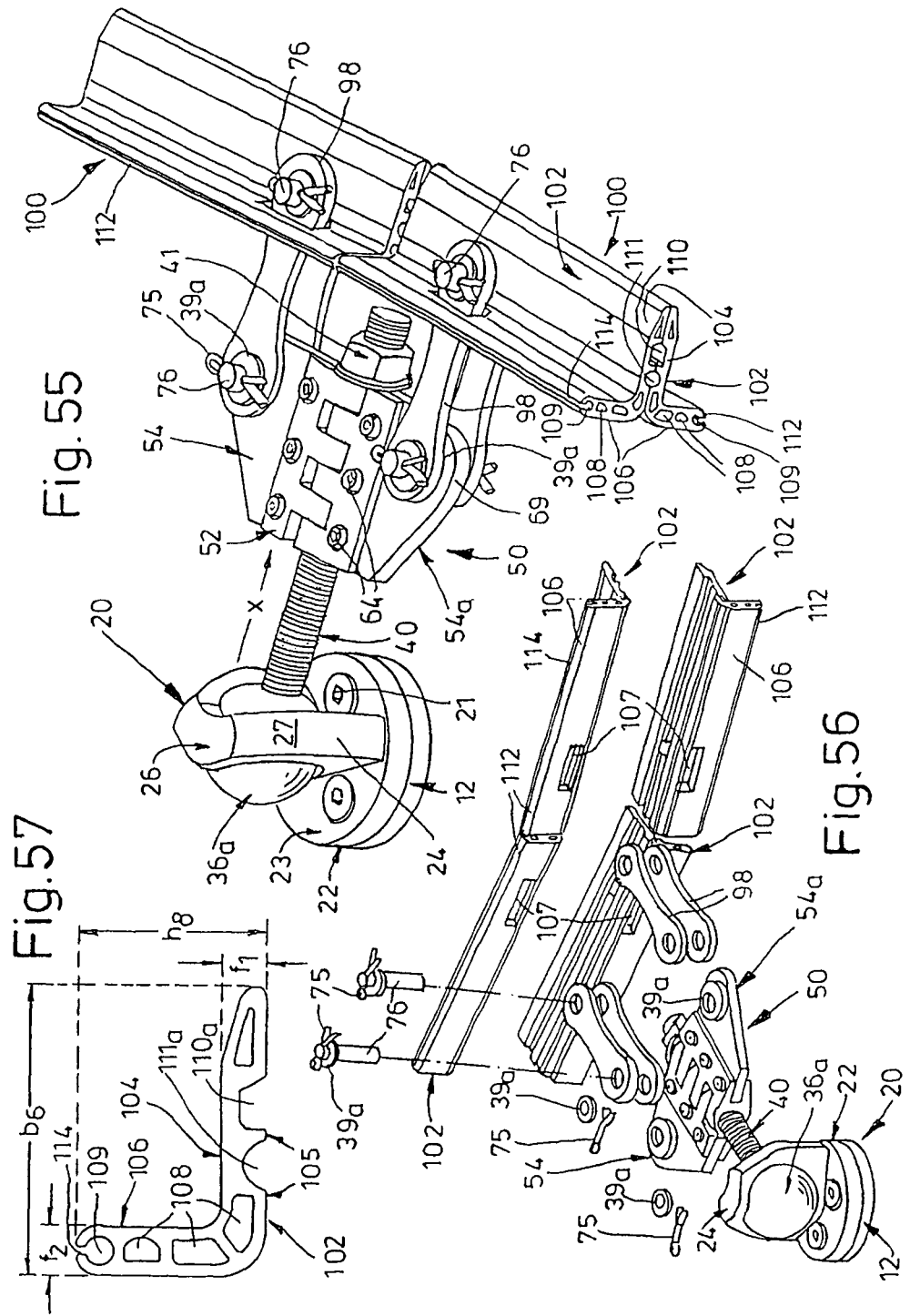

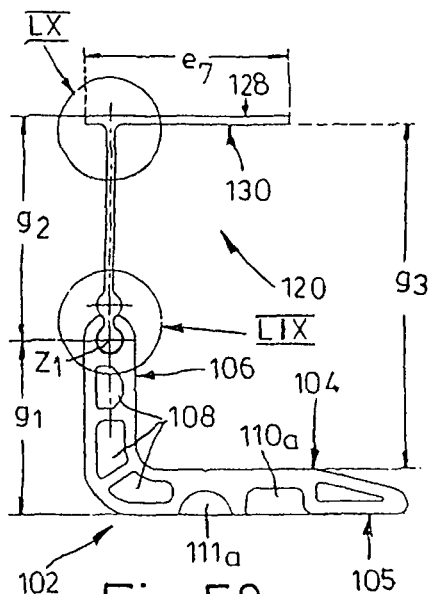
Fig. 58
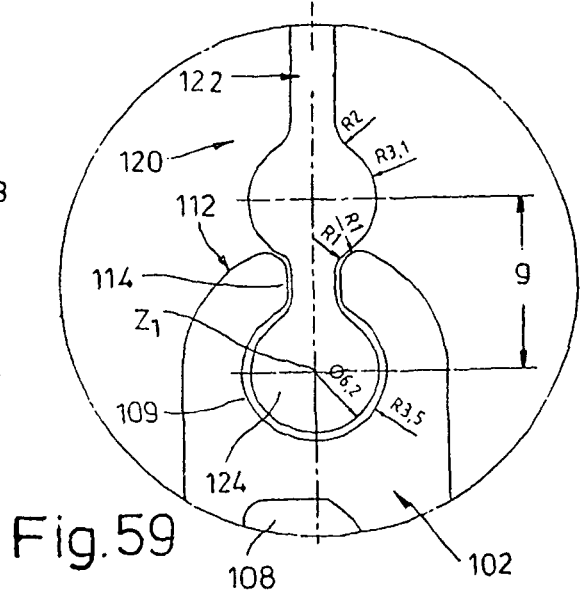
Fig. 59 / Fig. 60
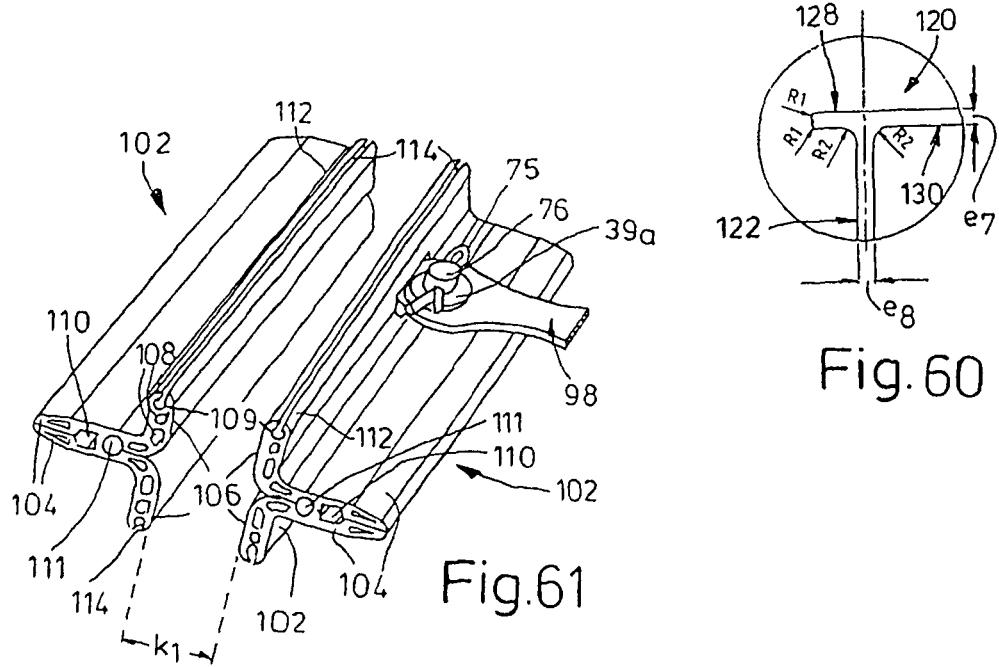
Fig. 61

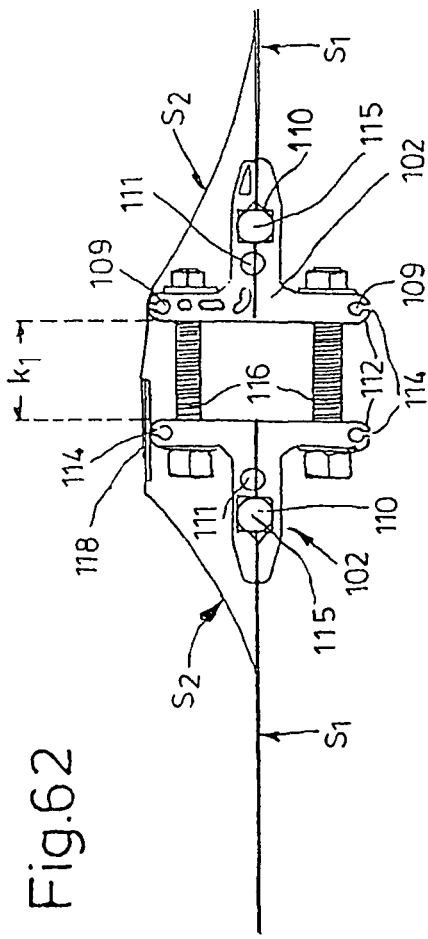
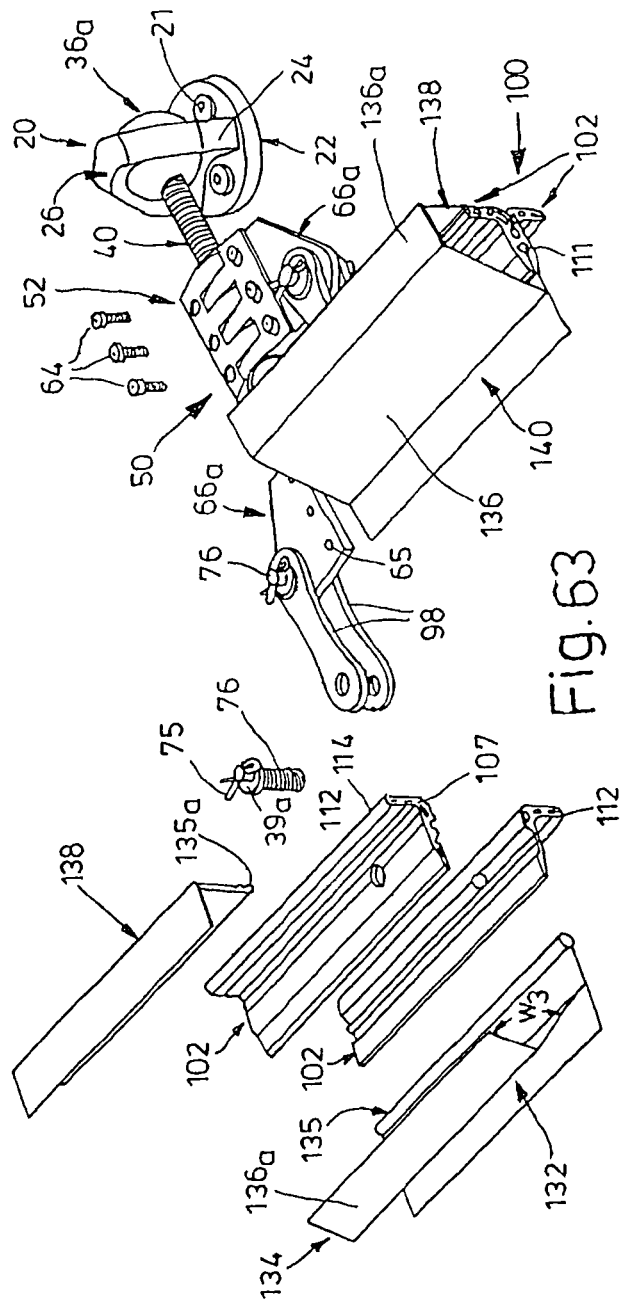
Fig. 62
Fig. 63

LOAD-ABSORBING DEVICE FOR INTRODUCING LOAD FORCES SUCH AS CABLE FORCES OR TENSIONING FORCES OF SHEET-LIKE STRUCTURES

FIELD OF THE INVENTION

The invention relates to a load-absorbing device for introducing load forces, such as cable forces or tensioning forces of sheet-like structures, into supporting structures. The device comprises at least one load-absorbing member, which can be anchored on the supporting structure by a bearing element.

BACKGROUND OF THE INVENTION

Modern architecture has increasingly incorporated concepts of load-bearing structures, where planar elements, such as tent-shaped or umbrella-shaped coverings form, as a textile building material, part of a load-bearing structure. The coverings are anchored or erected on support systems, for example, steel supports. For the respective elements to form space-creating structures of a desired architectural design, the respective suitable introduction of load forces, in particular, the tensioning or bearing cable forces, is a crucial factor. Hence, it must be ensured that the line of action of the cable force that is to be introduced and that acts on the respective support system is independent of the respective orientation (inclination) of the support that is a part of the load-bearing structure to avoid distortions of the desired architectural design.

SUMMARY OF THE INVENTION

An object of the invention is to provide an improved load-absorbing device that satisfies, in particular, the associated requirements.

The invention basically achieves this object with a load-absorbing device where the load is transferred between the load-absorbing member and the bearing element by a transmission body. The transmission body forms, on its outer surface, a convexly curved transmission surface guided on the bearing element on a support surface of concave surface parts. The concave surface parts are matched to the convexity of the transmission surface, resulting in a load-absorbing joint that allows a ball joint-like mobility of the load-absorbing member relative to the supporting structure. This ball joint-like mobility allows the respective load-absorbing member to be adjusted, independently of the respective arrangement of the supporting elements of the support system. Depending on the configuration of a respective load-bearing structure, it involves steel supports of varying orientation or inclination or wall areas, as a function of the line of action of the engaging cable forces, so that an optimal anchoring or erecting of the respective tent-shaped or umbrella-shaped element is ensured. In this case, the load-absorbing joint could also be secured. The supporting structure could be moved relative to the joint.

The bearing element exhibits preferably bearing flanges, which extend away from the plane of at least one connecting area provided for mounting on the supporting structure. The flanges leave between them an aperture with an interior wall that forms the surface parts of the support surface, where the force is introduced from the transmission body of the load-absorbing member.

A hinge joint with bearing flanges, which form between them a joint-like bearing of the transmission body of the load-absorbing member, can be constructed preferably such that the bearing flanges project at a right angle from the plane of the respective connecting area. If the connecting area forms a base plate of the hinge joint, then this base plate can be mounted, for example, on the apex of a support column. The bearing flanges extend along the direction of the longitudinal axis of the column. Tensioning forces with lines of action in an angular range can be introduced transversely to the longitudinal axis of the column.

The arrangement is configured preferably such that the bearing flanges are formed by beam-shaped lateral bodies. These lateral bodies can form on their ends, which are situated at a distance from the base plate, a ridge surface that connects the ends or leaves on these ends a gap between them. Exemplary embodiments with lateral bodies, which are connected at the ends, allow high forces to be introduced with a high degree of certainty, while simultaneously satisfying the requirement of a small design space.

In especially advantageous embodiments, the lateral bodies define legs that diverge from the center of the base plate in the direction of a tension rod that extends from the aperture and that together with the transmission body forms the load-absorbing member. The bearing flanges can be formed by side walls of a solid body containing the aperture in the central region.

An especially high structural stability and good articulation properties, due to the support surface configured to have a relatively large area, are apparent in one exemplary embodiment, where the ridge surface connecting the lateral bodies forms a protruding nose body that projects in the direction of the tension rod extending from the aperture.

If a solid body forming the bearing flanges is constructed in a box-shaped manner, this solid body can then form two planar connecting areas situated diametrically opposite with respect to the aperture. Moreover, at these connecting areas, the solid body can be connected to the console plates of the supporting structure. These console plates are arranged in parallel and set apart from each other. Instead of a box-shaped solid body, a body in the shape of an ellipsoid can form the bearing flanges.

The surface parts, which are situated between the bearing flanges in the aperture and which form the support surface, can be curved such that the transmission body of the load-absorbing member can be brought into contact with the surface parts, forming the support surface, from the one side or the other side of the bearing flanges.

Especially good articulation properties of a respective hinge joint are guaranteed if the transmission surface on the transmission body exhibits at least parts of a spherical surface. The surface parts, forming the support surface, correspond to parts of a spherical cap.

In especially advantageous embodiments, the transmission body is mounted on the end of a tension rod, which serves as a tensioning member.

In this case, the arrangement can be configured such that the transmission body is constructed as a solid sphere and forms with the tension rod a coherent unit having positive fit.

To this end, the tension rod can be provided with an external thread and can be screwed into a threaded blind hole of the solid sphere.

An external thread that is located on the tension rod offers the additional advantageous possibility of mounting a connecting element. By the connecting element, the cable forces or the tensioning forces are transferred, on the tension rod by the threaded connection so that a tensioning or retensioning at the connecting element is possible in a turnbuckle-like manner.

As an alternative, the spherical body, which serves as the transmission body, may have a passage drill hole, through which the cap screw, forming the tension rod is inserted. The screw head of this cap screw is supported on the edge of the passage drill hole to transfer the tensioning force.

In this case, the transmission body may have a planar flattening as the engagement surface for the screw head. This flattening is formed on the edge, assigned to the screw head, of the passage drill hole.

If the vertical wall areas are provided as the supporting structure for the respective hinge joints, advantageously the bearing element forming the support surface of the hinge joint has a round cup body. At its cup aperture, the cup body passes into a ring body made as one piece with the cup body and forms a connecting area provided for mounting on the wall areas forming the supporting structure. The cup body projects perpendicularly from the plane of the connecting area. The cup floor has an aperture for the emergence of the tension rod. The interior wall of the cup body adjacent to the aperture forms the support surface matched to the transmission surface of the sphere accommodated in the cup body.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 3 is a perspective view of the disassembled hinge holder of FIG. 2 with its assigned insert screw or rotary screw as well as with an end disk of the column;

FIG. 4 is a side elevational view of the assembled hinge holder of FIG. 3 with an inserted insert screw;

FIG. 5 is a front elevational view of the hinge holder of FIG. 3;

FIG. 6 is a rear elevational view of the hinge holder of FIG. 3;

FIG. 7 is a top plan view of the hinge holder of FIG. 3;

FIG. 8 is a top plan view of a base plate of the hinge holder of FIGS. 3 and 6;

FIG. 9 is a front elevational view in section of the hinge holder of FIG. 7 taken along line IX-IX;

FIG. 10 is a perspective view of the hinge holder of FIG. 2;

FIG. 11 is a side elevational view of the hinge holder of FIG. 10;

FIG. 12 is a side elevational view in section of the hinge holder of FIG. 10 taken along line XII-XII of FIG. 7;

FIG. 13 is an exploded perspective view of a hinge holder according to a second exemplary embodiment of the invention with its assigned insert or rotary screw as well as with an end region of the column;

FIG. 14 is a top view of the assembled hinge holder of FIG. 13;

FIG. 15 is a side elevational view in section of the hinge holder of FIG. 14 taken along line XV-XV;

FIGS. 16 to 18 are front, rear and perspective views of the hinge holder of FIGS. 13 to 15, respectively;

FIG. 19 is a perspective view of the hinge holder of FIG. 13 on the end of a horizontally extending column;

FIG. 20 is a perspective view of a hinge holder according to a third exemplary embodiment of the invention;

FIG. 21 is a front view of the hinge holder of FIG. 20;

FIG. 22 is a side elevational view in section of the hinge holder of FIG. 20 along line XXII-XXII of FIG. 21;

FIG. 23 is a top plan view of the hinge holder of FIG. 20;

FIG. 24 is a front elevational view in section of the hinge holder of FIG. 20 taken along line XXIV-XXIV of FIG. 23;

FIG. 25 is a perspective view of a front plate of the hinge holder of FIG. 20;

FIG. 26 is a front elevational view of the front plate of FIG. 25;

FIG. 27 is a top plan view of the front plate of FIG. 25;

FIG. 28 is a perspective view of a hinge holder according to a fourth exemplary embodiment of the invention;

FIG. 29 is a top plan view of the hinge holder of FIG. 28;

FIG. 30 is a perspective view of a hinge holder according to a fifth exemplary embodiment of the invention;

FIG. 31 is a front elevational view of the hinge holder of FIG. 30;

FIG. 32 is a top plan view of the hinge holder of FIG. 30;

FIG. 33 is a side elevational view in section of the hinge holder of FIG. 30 taken along line XXXIII-XXXIII of FIG. 31;

FIG. 34 is a perspective view of a front plate of the hinge holder according to FIG. 30;

FIG. 35 is a front view of the front plate of FIG. 34;

FIG. 36 is a top plan view of the front plate of FIG. 34;

FIG. 37 is a perspective view of a holding plate of two connecting plates and connected with the insert screw of the hinge holder of FIG. 2 by a base hinge;

FIG. 38 is a perspective view of one of the connecting plates of FIG. 37;

FIG. 39 is a perspective view of a connecting plate according to an alternative embodiment;

FIG. 40 is a perspective view of a part of the base hinge of FIG. 37;

FIG. 41 is a front elevational view of the part of FIG. 40;

FIG. 42 is an enlarged front elevational view of the part of FIG. 40 according to region XLII of FIG. 41;

FIG. 43 is a top plan view of a part of the holding plate of FIG. 37;

FIG. 44 is a front elevational view of the part of FIG. 43;

FIGS. 45 to 47 are perspective views of the hinge holder of FIG. 2 in different positions;

FIG. 48 is a perspective view of a holding plate connected with the insert screw of the hinge holder by a base according to an exemplary embodiment of the invention;

FIG. 49 is a perspective view of a part of the base hinge of FIG. 48;

FIG. 50 is a front elevational view of the part of FIG. 49;

FIG. 51 is an enlarged front elevational view of the part of FIG. 49 in region LI of FIG. 50;

FIG. 52 is a front elevational view of a part of the holding plate of FIG. 48;

FIGS. 53 and 54 are top plan views of the part of FIG. 53;

FIG. 55 is a perspective view of a connecting member with an attached additional strip of two adjacent angle sections of the hinge holder of FIG. 2 according to an exemplary embodiment of the invention;

FIG. 56 is a disassembled perspective view of the arrangement according to FIG. 55;

FIG. 57 is an enlarged side elevational view of an angle section of FIGS. 55 and 56;

FIG. 58 is a side elevational view of the angle section in FIG. 57 with an attached top;

FIGS. 59 and 60 are side elevation views in an enlarged section of the angle section of FIG. 58 in regions LIX and LX, respectively, of FIG. 58;

FIG. 61 is a perspective view of two strips assigned to each other according to an alternative embodiment for a hinge holder according to the invention;

FIG. 62 is a front elevational view of an installation drawing of the strips of FIG. 61;

FIGS. 63 and 64 are disassembled perspective views of two additional arrangements of strips according to alternative embodiments for use with the hinge holder of the invention;

DETAILED DESCRIPTION OF THE INVENTION

Figure 1:
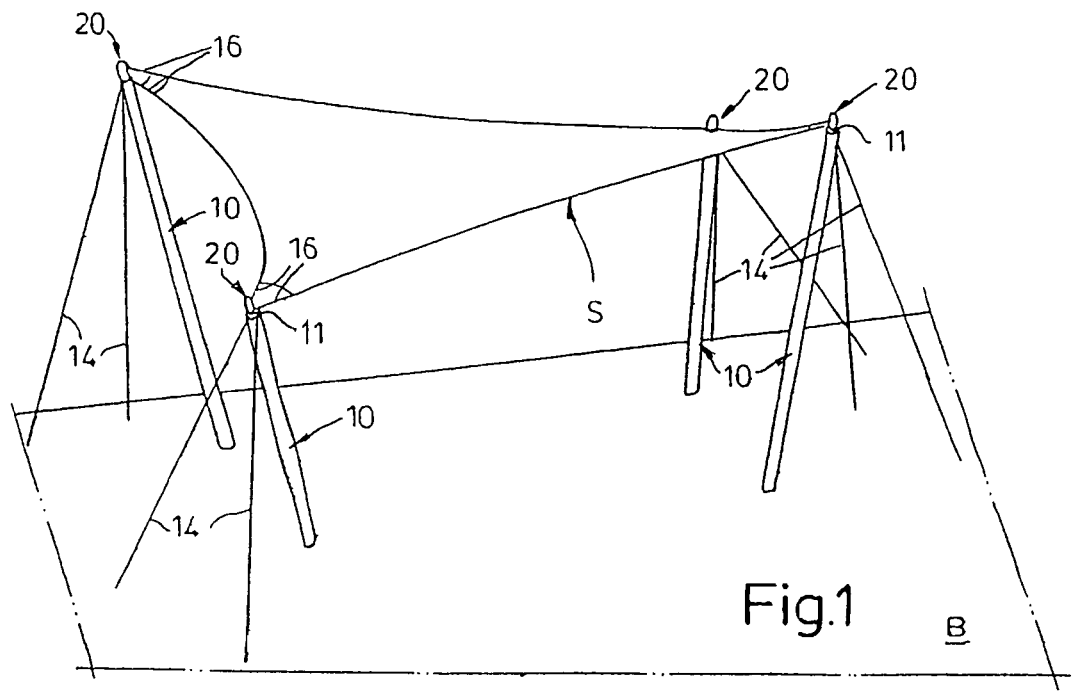
FIG. 1 is a perspective view of a roof covering composed of a sail mounted between four columns and referred to as a roof membrane according to the invention.

A plane load-bearing structure has, according to FIG. 1, four somewhat outwardly inclined columns 10. Columns 10 are set apart from each other and reach upward in pairs from a floor area B and stretch between their free ends 11 a sail S. Sail S has an approximately rectangular contour and is made of a textile material, as a membrane-like roof surface. On the other hand, those free ends 11 are tensioned by cables 14 against the floor area B and anchors (not illustrated herein) that are secured on the floor area. The four corner regions of this membrane S or a correspondingly constructed net are connected in each case by short cable strands 16 to hinge joints 20 projecting from the head surface $12_k$ of the column 10. The head surface $12_k$ forms the upper edge of the supporting structure and is formed by an end disk 12 inserted into the column 10.

Figure 2:
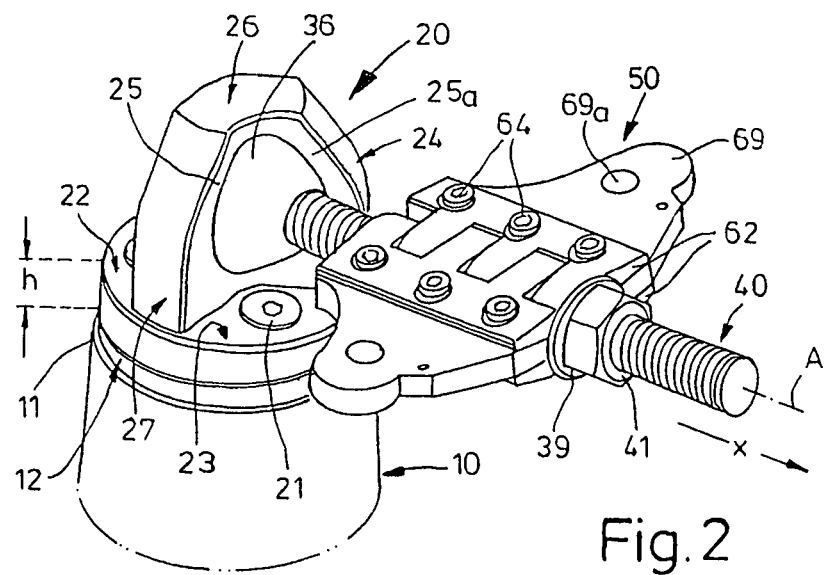
FIG. 2 is a perspective view of a hinge holder or joint mounted on the apex or head surface of a column of FIG. 1 and securing the sail on the column according to a first exemplary embodiment of the invention.

According to FIGS. 2 and 3, a base plate 22 having a diameter d of, for example, 117 mm and a height h of, for example, 20 mm, of the hinge joint 20 has a bearing element 24. Bearing element 24 has an angular configuration in FIGS. 7 and 14 and a height $h_1$ of 100 mm and a thickness e of approximately 37 mm, with two molded-on leg sections 25, $25_a$. The sections 25, $25_a$ form a two-armed configuration having an angle w of approximately 120°, as shown in the top view of FIG. 7.

As shown in FIGS. 3, 5, and 6, two side surfaces 27 of a width e extend from a ridge surface 26 of the bearing element 24. The upper top region of the side surfaces is slightly curved in the direction of the ridge surface 26. The width of the connecting region $25_q$ of the two curved sections 25, $25_a$ in the ridge surface 26 is designated as $e_1$ in FIGS. 7 and 12.

The ridge surface 26 and each of the side surfaces 27 define outwardly a wall region of the hinge joint 20 or more specifically the bearing element 24 that exhibits a curved longitudinal cross section. A relatively large aperture 30 is milled into the center of this bearing element as well as axially in relation to the central axis M of the hinge joint 20. The edge 32 of this aperture extends at an axial distance a of about 10 mm in relation to the planar ridge surface 26. The distance $h_2$ between the center Z of the aperture and the base plate 22 measures approximately 50 mm. Moreover, due to the milling and the angular configuration of the bearing element 24, that edge 32 is slightly curved in the cross section and defines a surface region 31 of the hinge joint 20. This surface region 31 is matched to a part of the surface of a bearing ball 36 (described below) that is capable of resting flush with the surface region 31 in the tensioning direction x (FIGS. 2, 11, 14, 55). The forces are transferred to the bearing element 24 by the engagement surface.

Between the pair of curved sections 25/$25_a$, there is a triangular surface section of the head surface 23 of the base plate 22, which surface section is triangular in shape in the top view. Its central region shows a screw hole 29 for a connecting screw 21. FIG. 8 shows the position of two additional screw holes 29 in the base plate 22. One of the screw holes lies in the transverse axis Q of the base plate. The two others lie on both sides of the transverse axis at distances $a_1$ from it of approximately 28 mm. Each screw hole 29, having a diameter i of 17 mm herein, passes over in the direction of the upper surface 23 of the base plate 22 into a funnel-shaped expansion 29, having an upper surface diameter $i_1$ of 29 mm.

The dimensions of all of the parts of the hinge joint 20 are adjusted to the respective cable forces that may arise. The securement elements that are designed to meet static requirements can be matched to a plurality of cables 14. Below are listed the dimensions for forces that may occur, for example, at a pointwise attachment having a tensioning force of approximately 100 kN.

FIG. 10 depicts the rotary screw 40 in the horizontal position as well as two of the three connecting screws 21, which approximately flank the curved section $25_a$.

The connecting screws 21, shown at the upper end in FIG. 3, in the attachment position, extend into the screw holes $29_e$ of the end disk 12 of the column 10.

In the working position, the bearing ball 36 having a diameter $d_1$ of approximately 74.5 mm sits in the aperture 30 of the bearing element 24. In the example according to FIGS. 11 and 12, this bearing ball 36 is provided with a surface 35 and a radial passage 37. The surface 35 serves as the stop face for the head 38 of a rotary screw 40 having a diameter f of 26 mm. A washer 39 is assigned to the head 38. According to FIG. 12, the longitudinal axis A of the rotary screw 40 of the bearing ball 36 is to be rotated with the bearing ball at an angle $w_1$ of approximately 80° (swivel level $A_1$ of the longitudinal axis A of the screw). Likewise, the bearing ball 36 can be swiveled horizontally. The possibilities of the directions of the bearing ball 36 in the bearing element 24 describe a conical shape.

FIG. 3 shows an inventive hinge joint 20 with the connecting member 50, which is also shown in FIG. 2, as individual parts for the sake of a better overview. The rotary screw 40 passes through the plate-like connecting member 50, which is fixed in position by a nut 41, supported on a washer 39, and which is described in detail below.

The hinge joint holder 20 of FIGS. 13 to 19 accommodates a bearing ball $36_a$ in its aperture $30_a$. The rotary screw 40 in this bearing ball extends into a blind hole 34 with an internal thread, that is, does not totally pass through this bearing ball $36_a$.

FIG. 19 offers a horizontal column $10_a$ as a variation. Arranged in parallel to the longitudinal axis E of this column, a protruding support tongue 42 with its position stabilizing support consoles 43 is molded to the column 10. The base plate 22 of the hinge joint 20 sits on this support tongue 42. The rotary screw 40 and the connecting member 51 extend parallel to the longitudinal axis E, that is, also horizontally.

Each of the side edges of the connecting member 51 has a threaded fitting 70, which is described in detail with respect to FIG. 39.

FIG. 20 shows a cassette-like or sleeve-like body 80, which can be secured, for example, on a wall area F with retaining screws 18. The screw holes 19 retain screws 18. This body 80 has two plates 82 which protrude in parallel from a rear wall 81 having a height $h_4$ of 100 mm. The plates 82 have a width $b_3$ of 140 mm and an overhang length $n_1$ of 120 mm and a thickness $e_4$ of 20 mm. The height $h_5$ of the interior space 79 of this body 80 also measures 100 mm. Between the free ends of those plates 82, a front plate 84 of a height $h_5$ contains the aperture 30 with the matching surface region 31. The aperture 30 of the front plate 84 can accommodate the bearing ball 36 without the rotary screw. FIGS. 25 to 27 show the shape of this front plate 84 with the inwardly shaped side wall surfaces 85 as well as a horizontal cross section that tapers in the direction of the central axis G of the front plate 84. The ridge surface 86 is constructed accordingly (FIG. 27).

This front plate 84 can also be inserted into a body $80_a$ that has asymmetrical overhang plates 83 (see FIGS. 28 and 29). In the top view, each of the overhang plates is provided with an overhang tongue 88 on a side surface. The distance $n_2$ between the overhang tongue and the rear area of the rear wall 81 is greater than the length of the other longitudinal side 87. In this case, the transversal distance $b_4$ between the longitudinal side 87 and the overhang tongue 88 is 92 mm.

FIG. 30 shows a totally different design concept of the wall joint 90. Two console plates 93 having an overhang length k of 48 mm project frontward at a distance $h_7$ of 70 mm from a rear plate 92 having a height $h_6$ of 150 mm, a width $b_5$ of 66 mm, and a thickness $e_4$ of 10 mm. The rear plate 92 is secured with retaining screws 18 on a wall (not illustrated).

Each of the console plates 93 that resemble tongues in the top view has a hole 94 for a connecting screw $21_a$ in the central axis T of the console plates. The screw 93 secures an annular retaining body 96 of the wall joint 90 between the console plates 93. The retaining body 96 holds a bearing ball $36_a$ in a central aperture 30.

The aperture 30 is centered in relation to the retaining body 96, having a height $h_5$ of 70 mm, a thickness $e_6$ of 31 mm, and a width $b_3$ of 54 mm. The aperture has a center Z.

The connecting member 50 referred to with respect to FIGS. 2 and 3 and having a width n of 120 mm projects in a wing-like manner from the rotary screw 40 with a head 38 against which the connecting member 50 rests. The rotary screw 40 passes through a central base hinge 52 composed of two hinge halves 54, $54_a$; each hinge half has a tubular part 56 having a width $e_2$ of 40 mm, according to FIG. 40, with a tubular channel 57 having a diameter $d_2$ of approximately 28 mm for accommodating the rotary screw 40, with three radial slots 58 as well as partial ring ribs 59 of the tubular part 56. The ribs 59 extend between the radial slots 58. The other hinge part $54_a$ is constructed in the same way so that, when the two parts are fitted together, the radial slots 58 in one part of the hinge 54 or $54_a$ is capable of receiving the respective partial ring ribs 59 of the other part of the hinge $54_a$ or 54, respectively. These two parts 54, $54_a$ of the hinge are held together by the rotary screw 40 that passes through their common tubular channel 57.

A wing plate 66 is inserted as the connecting tension bracket into the respective external oblong slot 60 of that hinge parts 54 or $54_a$, respectively, that crosses with its adjacent overhang ribs 62 three screw holes 63, with a molded-on push bar 68 that forms a linear edge 67. This wing plate is secured in position with three socket head cap screws 64, which in turn then also cross the oblong slot 60 and the drill holes 65 of the push bar 68. The configuration of this wing-shaped connecting plate 66 resembles that of the lid of a grand piano and ends relative to the push bar 68 with a protruding semicircular tongue piece 69 that contains a passage hole $69_a$ near the edge.

FIG. 39 is an oblique view of a wing plate $66_a$ that has, instead of the tongue piece, a straight side edge $67_a$ that extends at an angle $w_2$ of, for example, 30° in relation to the free edge 67 of the plate $66_a$. This obliquely extending side edge $67_a$ rests against a lateral tube 72, which accommodates a hexagonal nut 73 with a push-on disk 74 having a semicircular cross section. In this case, it involves the threaded fitting 70.

FIGS. 45 to 47 show different positions of the overhang plate 60 of a connecting member 50. In FIGS. 45 and 46, the rotary screw 40 runs at approximately right angles to the longitudinal axis E of the column 10 or more specifically the central axis M of the hinge joint 20. In FIG. 47, the longitudinal axis A of the rotary screw 40 is folded upward at an angle t of approximately 45° in relation to the central axis M.

The connecting member $50_a$ of FIG. 48 resembles the just described connecting member 50 with the one difference that the rotary screw 40 passes through a central tubular channel 77 of the connecting member $50_a$, which in this case is constructed as one piece. The central hinge of FIG. 37 is missing here. The connecting member $50_a$ is constructed as a flat plate, since, instead of a pairing of two hinge halves 54 according to FIGS. 48, 49, there is a compact base plate 80 with the central tubular channel 77, with the vertex $e_3$ of the base plate 80 being 40 mm, with the length n being 120 mm, and with the width b being 100 mm. The distance $b_1$ between the two rows of screw holes 63 measures 70 mm. Their distance $b_2$ from the adjacent longitudinal edge 61 is 15 mm in each case. The clear height $h_3$ of the lateral oblong slots 60 is 13 mm, a distance that matches the dimension in FIG. 42.

The drawings do not show that in this case, too, it is possible to use the described threaded fitting 70.

According to FIGS. 55 and 56, the connecting member 50 can also be used as the connecting element for strip-shaped keder profiles 100. Such a keder profile 100 is connected to the connecting member 50 by tension brackets 98, which are mounted in a rotationally limited manner at both ends. At the same time, the pins 76 pass through the keder profile 100 and the tension bracket 98. Each pin 76 is fixed in position at both ends by a safety cotter pin 75, which passes radially through each pin. The pin 76 passes through both the hinge parts 54 and $54_a$, respectively, and also a washer $39_a$ on both sides of the tension bracket 98.

Each of the two keder profiles 100 of FIGS. 55 and 56 has two angle sections 102 that are molded by extrusion molding from a light metal alloy, with each of these angle sections having an L-shaped cross section. In FIG. 55 sections 102 form together with a base arm 104 an overhang plate as well as two end strips 106, reaching upward at a right angle from the overhang plate at an edge. According to FIG. 57, each angle section 102 has a cross-sectional height $h_8$ of 50 mm, a cross-sectional width $b_6$ of approximately 80 mm, as well as a thickness $f_1$ of 12 mm or $f_2$ of 13 mm, and contains a plurality of longitudinal channels 108 or 109, respectively. In addition, the base strips 104, which lie one over the other, form with the recesses $110_a$, $111_a$, which are also situated one over the other and are a part of the external surfaces 105 (FIGS. 55 and 57) of the base strips. A common central channel 110 has an approximately rectangular cross section, and a common longitudinal channel 111 has a circular cross section.

The end strips 106 contain the passage slots 107 crossing the end strips for the tension brackets 98 and terminate in each case with a longitudinal edge 112 into which an oblong slot 114 extends. On the other hand, the oblong slot issues from the adjacent longitudinal channel 109. This oblong slot 114 serves to accommodate a keder, secured on the edge of textile surface. This keder has to be enveloped by the membrane, which is welded together. Then the keder of a defined strength sits rigidly and immovably on the edge of the textile sheet. This keder has to transfer the forces of the transverse direction to a structural element, to the keder profile 100 in the example of FIG. 55.

FIGS. 58 to 60 show a portion of a mounting section 120, having a right angular cross section, for the angle section 102. A shaped plate 122 extends from the end strip or transverse strip 106 of the profile, the shaped plate sitting with an endwardly molded-on round bead 124 in the longitudinal channel 109 of the angle section 102. Above the longitudinal edge 112, which is semicircularly curved in the cross section, there is a second shaped bead 126 of the shaped plate 122. The center points of the two beads 124, 126 form a distance g of 8.6 mm. The distance $g_1$ of the center point $Z_1$ of each round bead 124 from the underside 105 of the base arm 104 of the angle section 102 measures 44 mm. The distance $g_2$ of the center point $Z_1$ from the upper surface 128 of a transverse plate 130, which is molded endwardly at a right angle onto the shaped bar 122, is 56 mm. The transverse plate has a width $e_7$ of 50 mm and a thickness $e_7$ of 2 mm. The clear distance $g_3$ of the transverse plate 130 from the base strip 104 measures 85 mm. The thickness $e_8$ of the shaped plate 122 is only slightly larger than the thickness $e_7$.

In FIGS. 61 and 62, two transverse strips of keder profiles 100 made of light metal sections are assigned to each other at a distance $k_1$. In FIG. 62 the end or transverse strips 106 of their angle sections 102 are connected by spacing screws 116. In this case, the figures show two membrane webs $S_1$ clamped with an edge in a respective central channel 110 by an inserted profile bar 115. Two cloth strips $S_2$ are laid over the angle sections 102 in order to protect them, are connected to each other on a longitudinal plate 118, and terminate on the surface of the membrane webs $S_1$. Owing to the oblong slot 114 of the longitudinal edge 112, this longitudinal plate is positioned in the longitudinal channel 109 adjacent to this longitudinal edge and extends at a distance in parallel to the spacing screws 116.

FIG. 63 shows a device analogous to that in FIG. 56, where the keder profile 100 is provided with a housing 140. This housing has a floor plate 132 with a profile bar 135 having a circular cross section. The profile bar in the working position rests in the transverse channel 111 of the transverse strip 100. A wall plate 134 having an angular cross section is hinged to the floor plate 136 with both wall strips 136, $136_a$ of the wall plate defining an angle $w_3$ of approximately 130°. In the working position, an angle section 138 is connected to the narrow wall strips $136_a$. The free edge of the angle section also forms a profile bar $135_a$. In the working position, this profile bar rests in the upper longitudinal channel 109 of the upper angle section 102.

Figure 64:
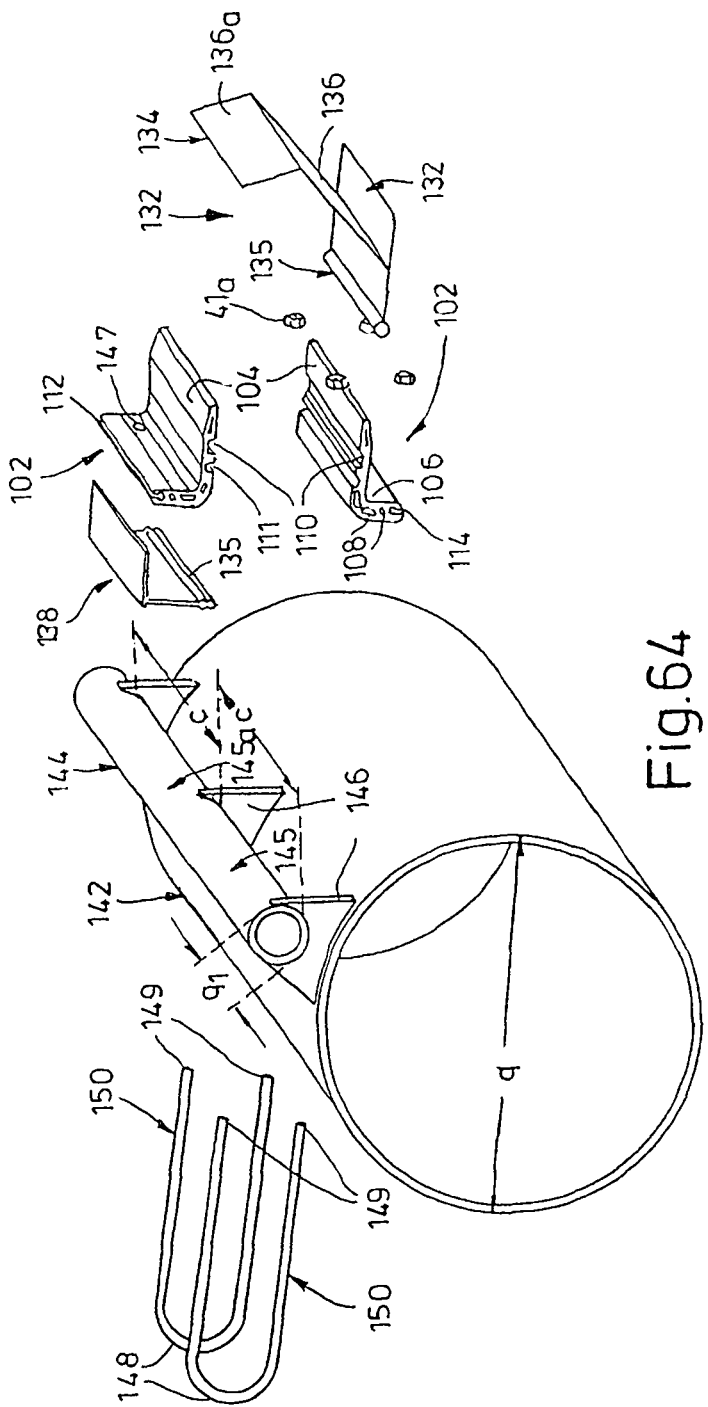
Figure 65:
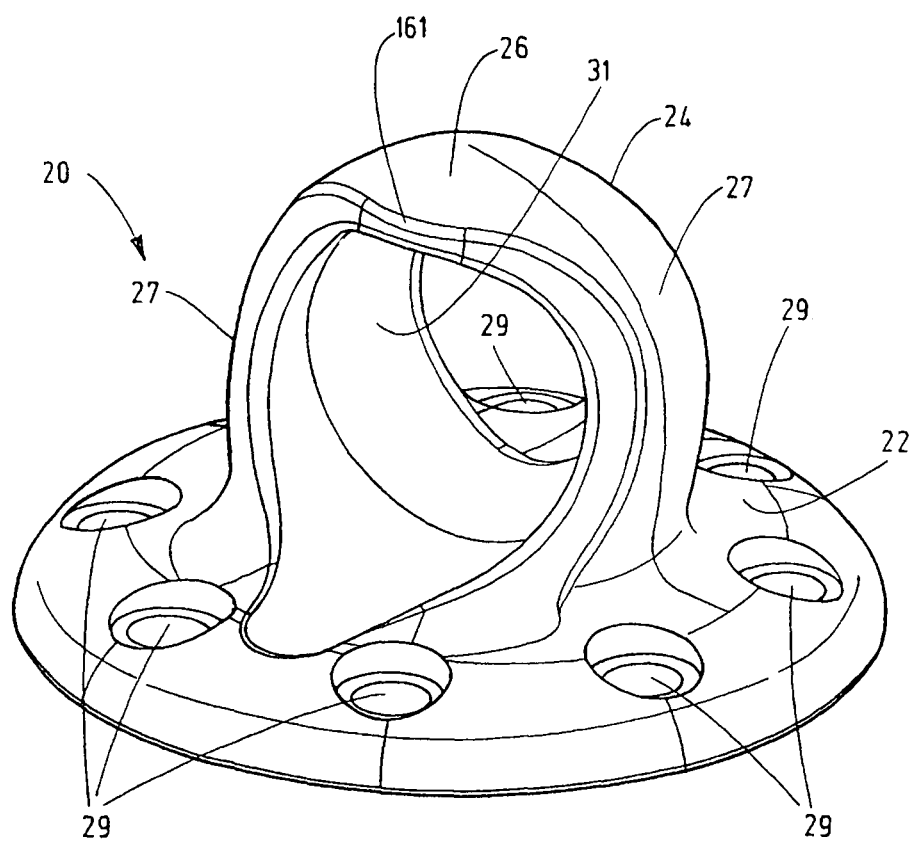
FIG. 65 is a perspective view of just the bearing element, which is molded as one piece on a ring body, forming the connecting area for mounting on the supporting structure, according to an additional embodiment of the invention.
Figure 66:
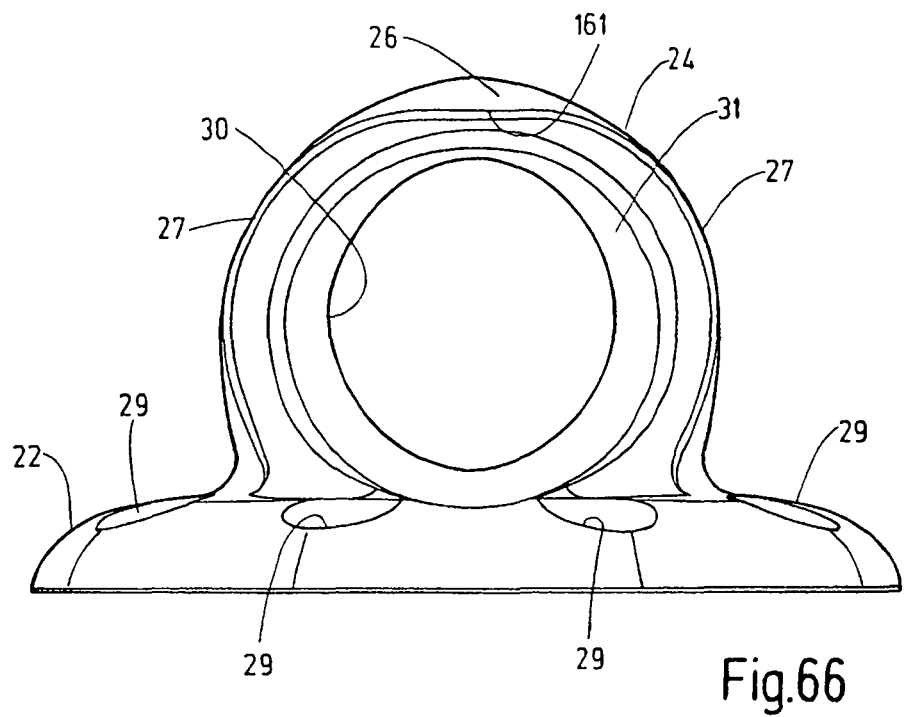
FIGS. 66, 67, and 68 are a rear elevational view, a side elevational view and top plan view of the bearing element shown in FIG. 65.
Figure 67:
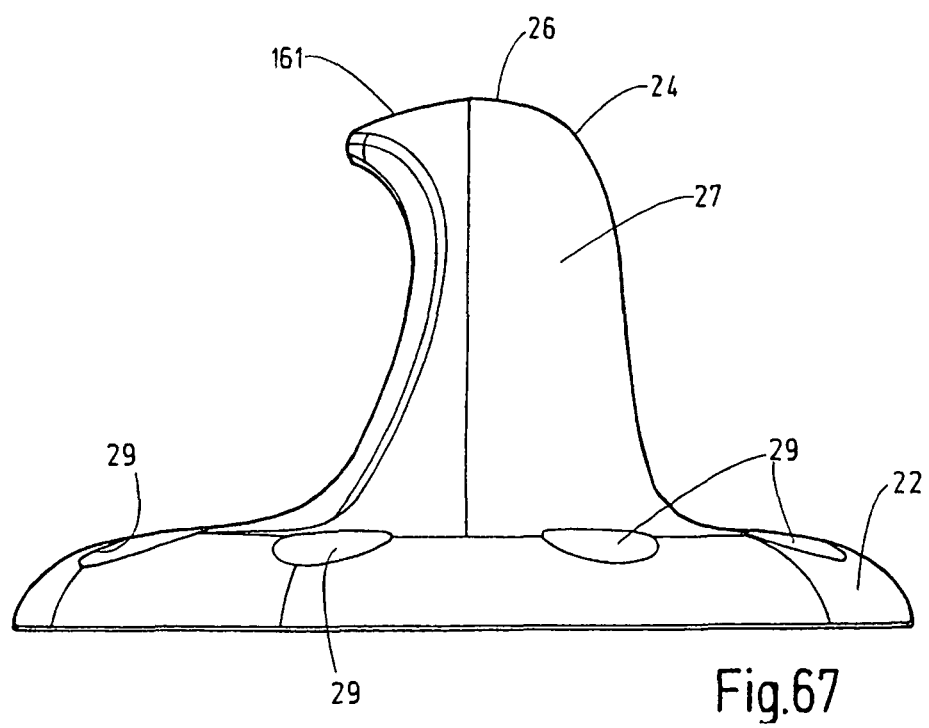
Figure 68:
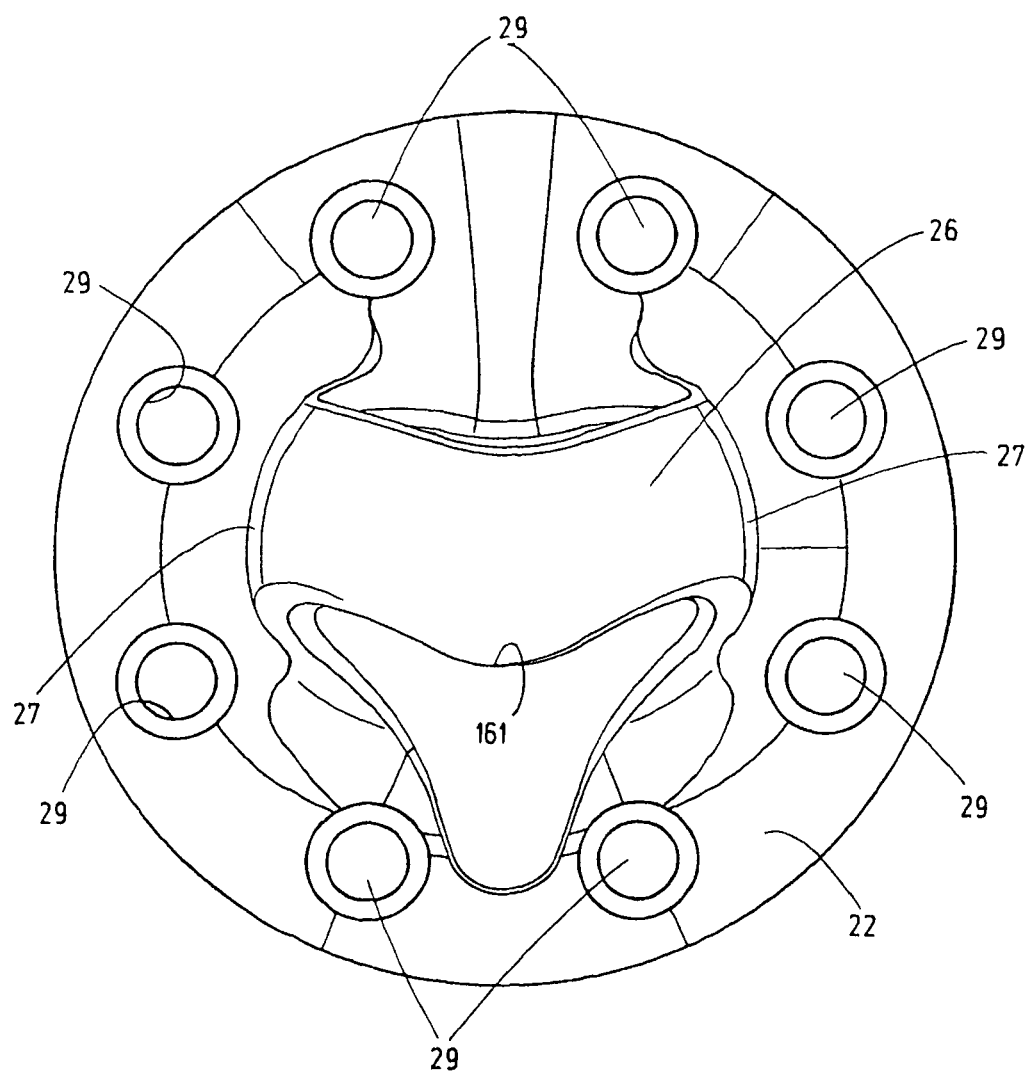

FIG. 64 is a connecting device of two net or cloth surfaces (not illustrated). A retaining tube 142, which is shown in sections and exhibits an external diameter q, is connected to a spaced ridge tube 144 having a significantly smaller diameter $q_i$ by three radial plates 146. U-shaped clamps 150 may be slid onto this ridge tube 144. The clamps can be secured with their bow end 148 on the ridge tube and are slid with a screw end 149 through a hole in one of the assigned angle sections 102. One of these holes 147 is shown in FIG. 64. Threaded nuts $41_a$ secure the two screw ends 149 of the clamp 150 on the angle section 102, on which the net or cloth surface is secured. The result is, for example, a rigid connection between two such textile surfaces, which rest in the adjacent hole sections 145, $145_a$ of the length c of the ridge tube 144.

FIGS. 65 to 69 show an additional embodiment, wherein the hinge joint is shown without the assigned load-absorbing member formed by the ball 36 and tension rod 40. As in the exemplary embodiments of FIGS. 2 to 18, there is a circularly round base plate 22, which forms the connecting area for attaching the respective supporting structure and has screw holes 29. As in the aforementioned exemplary embodiments, bearing flanges, which extend from the center of the base plate 22, are formed by the legs 27 of the beam-like lateral bodies. The ends of the lateral bodies located at a distance from the base plate 22 form a ridge surface 26, connecting those ends. At variance with the aforementioned exemplary embodiments, the ridge surface 26 forms a protruding nose body 161, which projects from the ridge surface 26 in the direction of the tension rod 40 (which is not illustrated in FIGS. 65 to 68) extending from the aperture 30.

Figure 69:
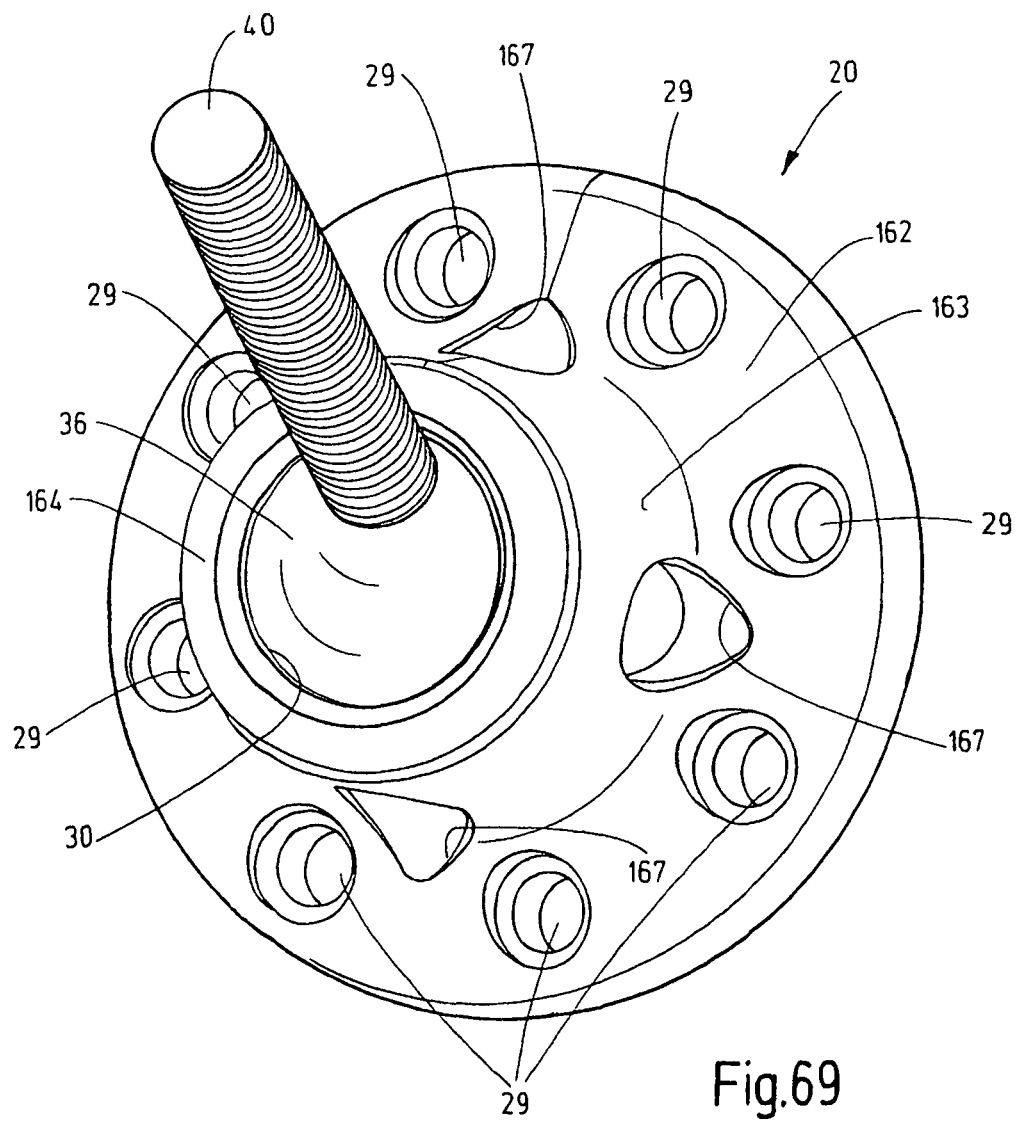
FIG. 69 is a perspective view of an additional embodiment of a hinge joint according to the invention.
Figure 70:
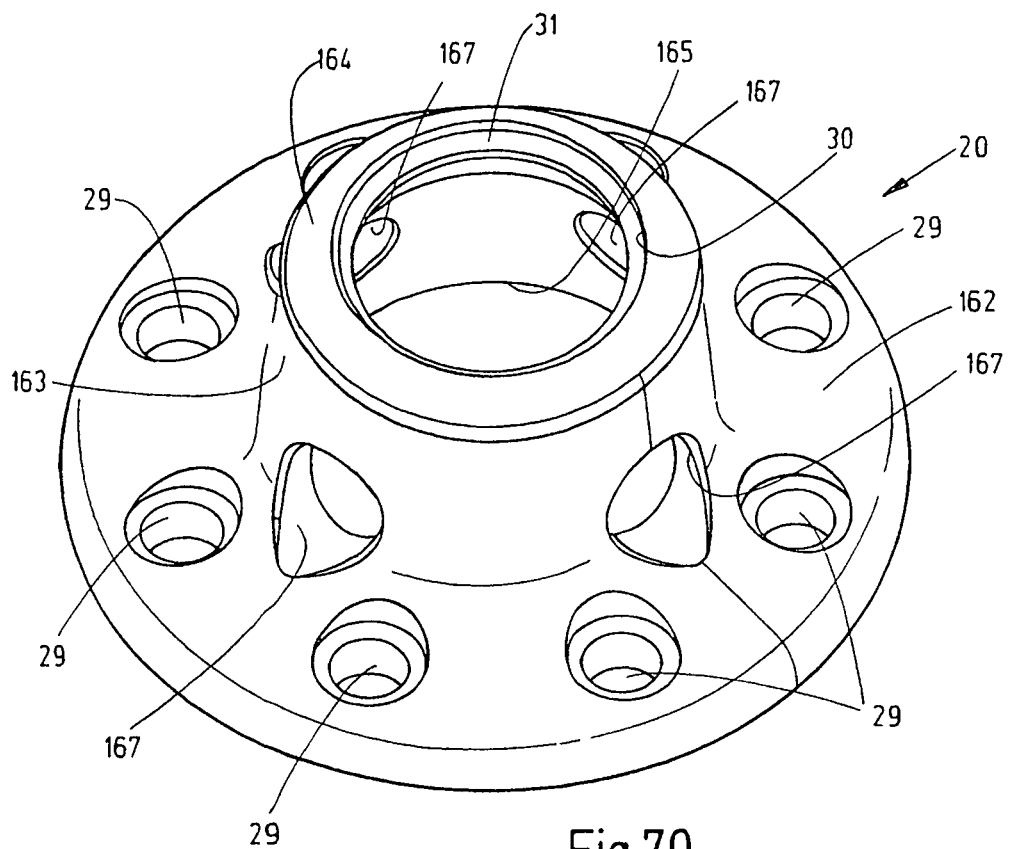
FIG. 70 is a perspective view of the hinge joint of FIG. 69, shown without the associated load-absorbing member.
Figure 71:
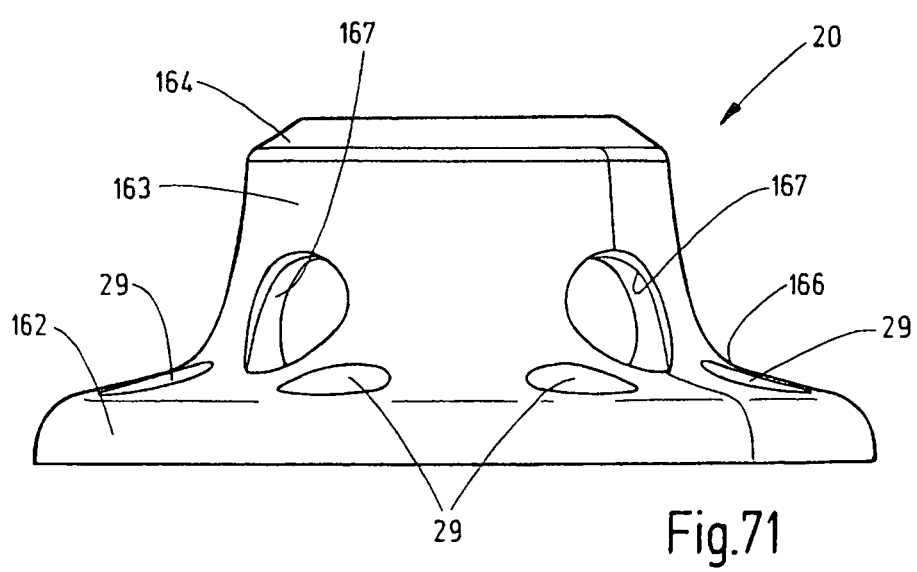
FIG. 71 is a side elevational view of hinge joint as shown in FIG. 70.

FIGS. 69 to 71 show another modified form of the hinge joint 20. In FIGS. 70 and 71, the load-absorbing member of ball 36 and tension rod 40 is not illustrated. In this embodiment, the function of the base plate 22 of this example is taken over by a circularly round ring body 162 having a series of screw holes 29. In this exemplary embodiment, there is a cup body 163 as the bearing element, with which the load-absorbing member 36, 40 engages. The cup body projects concentrically from the ring body 162 and is constructed in such that the cup floor 164 has a smaller diameter than the cup aperture 165, at which the cup body 163 passes over into the ring body 162 with a curved outer wall contour at 166 as one piece. For the passage of the tension rod 40 of the ball 36, which is accommodated in the interior of the cup body 163, the cup floor 164 forms a central aperture 30. The interior wall, which borders the aperture 30 and is a part of the cup floor 164, forms the concave support surface 31 matched to the convexity of the ball 36. The exemplary embodiment according to FIGS. 69 to 71 is especially appropriate for mounting on a vertical wall area, forming the supporting structure. As in the example of FIGS. 65 to 68, the bearing element, including the base plate 22 or the ring body 162 and, thus, the one-piece bearing flanges 27 or the cup body 163, can also be a one-piece casting made of metal in the example in FIGS. 69 to 71. It also being possible to provide recesses 167 in the side wall of the cup body 163 in order to reduce the weight.

While various embodiments have been chosen to illustrate the invention, it will be understood by those skilled in the art that various changes and modifications can be made therein without departing from the scope of the invention as defined in the appended claims.

What is claimed is:

1. A load-absorbing device for introducing load forces into supporting structures, comprising:
at least one load absorbing member having a transmission body with a convexly shaped transmission surface,
a bearing element anchorable on a supporting surface and having a concave support surface formed of concave surface parts guiding and engaging said transmission surface thereon and having a convexity matched to said transmission surface to anchor said load absorbing member on the supporting surface, said bearing element having at least one connecting region defining a plane and having bearing flanges extending away from said plane, said connecting region being connectable to the supporting surface, said bearing flanges having an aperture therebetween with an interior wall forming said surface parts of said support surface.

2. A load-absorbing device according to claim 1 wherein said bearing flanges project at a right angle from said plane of said connecting region.

3. A load-absorbing device according to claim 1 wherein said surface parts are situated between said bearing flanges in said aperture and are curved such that said transmission body can contact said surface parts from either side of said bearing flanges.

4. A load-absorbing device according to claim 1 wherein said connecting region has a base plate with a plane; and said bearing flanges project from said plane of said base plate.

5. A load-absorbing device according to claim 4 wherein said bearing flanges comprise ends situated at a distance from said base plate, said ends having a gap therebetween.

6. A load-absorbing device according to claim 1 wherein said bearing flanges comprise beam-shaped lateral bodies.

7. A load-absorbing device according to claim 6 wherein said lateral bodies diverge from a center of said connecting region in a direction of a tension rod extending from said aperture, said tension rod forming a part of said load-absorbing member with said transmission body.

8. A load-absorbing device according to claim 1 wherein said bearing flanges comprise ends situated at a distance from said plane of said connecting region with a ridge surface connecting said ends.

9. A load-absorbing device according to claim 8 wherein said ridge surface forms a protruding nose body projecting in a direction of a tension rod extending from said aperture.

10. A load-absorbing device according to claim 1 wherein said bearing flanges comprise side walls of a solid body having said aperture in a central region thereof.

11. A load-absorbing device according to claim 10 wherein said solid body is box-shaped with two planar connecting areas situated diametrically opposite with respect to said aperture.

12. A load-absorbing device according to claim 11 wherein said solid body has an ellipsoid shape.

13. A load-absorbing device according to claim 1 wherein said transmission surface forms at least parts of a spherical surface; and
said surface parts correspond to parts of a spherical cap.

14. A load-absorbing device according to claim 13 wherein said transmission body is mounted on an end of a tension rod.

15. A load-absorbing device according to claim 14 wherein said transmission body comprises a solid sphere and forms a coherent unit having a positive fit with said tension rod.

16. A load-absorbing device according to claim 15 wherein said tension rod comprises an external thread.

17. A load-absorbing device according to claim 16 wherein said solid sphere comprises a blind bore with an internal thread threadedly engaged with said external thread.

18. A load-absorbing device according to claim 15 wherein said solid sphere comprises a passage drill hole through which said tension rod extends, said tension rod comprising a cap screw having a screw head supported on an edge of said passage drill hole to transfer a tension force.

19. A load-absorbing device according to claim 18 wherein said transmission body comprises a planar flattening forming an engagement surface for said screw head, said planar flattening being formed on said edge of said passage drill hole.

20. A load-absorbing device according to claim 15 wherein said bearing element comprises a round cup body forming said bearing flanges and extending from a ring body forming said connecting region at a cup aperture of said ring body, said ring body being formed as one piece with said cup body, said cup body projecting perpendicularly from said ring body and including a cup floor having said aperture of said bearing flanges, said tension rod extending through said aperture of said bearing flanges, an interior wall of said cup body adjacent to said aperture of said bearing flanges forming said support surface, said transmission surface forming a ball accommodated in said cup body.

21. A load-absorbing device for introducing load forces into supporting structures, comprising:
at least one load absorbing member having a transmission body with a convexly shaped transmission surface,
a bearing element anchorable on a supporting surface and having a concave support surface formed of concave surface parts guiding and engaging said transmission surface thereon and having a convexity matched to said transmission surface to anchor said load absorbing member on the supporting surface, said bearing element having bearing flanges of side walls of a solid body and having an aperture in a central region thereof.

22. A load-absorbing device according to claim 21 wherein said solid body is box-shaped with two planar connecting areas situated diametrically opposite with respect to said aperture.

23. A load-absorbing device according to claim 22 wherein said solid body has an ellipsoid shape.

24. A load-absorbing device for introducing load forces into supporting structures, comprising:
at least one load absorbing member having a transmission body with a convexly shaped transmission surface,
a bearing element anchorable on a supporting surface and having a concave support surface formed of concave surface parts guiding and engaging said transmission surface thereon and having a convexity matched to said transmission surface to anchor said load absorbing member on the supporting surface, said transmission surface forming at least parts of a spherical surface, said surface part corresponding to parts of a spherical cap, said bearing element having a connecting region connectable to a supporting surface.

25. A load-absorbing device according to claim 24 wherein said transmission body is mounted on an end of a tension rod.

26. A load-absorbing device according to claim 25 wherein said transmission body comprises a solid sphere and forms a coherent unit having a positive fit with said tension rod.

27. A load-absorbing device according to claim 26 wherein said tension rod comprises an external thread.

28. A load-absorbing device according to claim 27 wherein said solid sphere comprises a blind bore with an internal thread threadedly engaged with said external thread.

29. A load-absorbing device according to claim 26 wherein said solid sphere comprises a passage drill hole through which said tension rod extends, said tension rod comprising a cap screw having a screw head supported on an edge of said passage drill hole to transfer a tension force.

30. A load-absorbing device according to claim 29 wherein said transmission body comprises a planar flattening forming an engagement surface for said screw head, said planar flattening being formed on said edge of said passage drill hole.

31. A load-absorbing device according to claim 26 wherein said bearing element comprises a round cup body extending from a ring body forming said connecting region and a cup aperture of said ring body, said ring body being formed as one piece with said cup body, said cup body projecting perpendicularly from said ring body and including a cup floor having a bearing aperture, said tension rod extending through said bearing aperture, an interior wall of said cup body adjacent to said bearing aperture forming said support surface, said transmission surface forming a ball accommodated in said cup body.

* * * * *